United States Patent
Oikawa

(10) Patent No.: US 10,297,058 B2
(45) Date of Patent: May 21, 2019

(54) APPARATUS, SYSTEM, AND METHOD OF CONTROLLING DISPLAY OF IMAGE, AND RECORDING MEDIUM FOR CHANGING AN ORDER OR IMAGE LAYERS BASED ON DETECTED USER ACTIVITY

(71) Applicant: Tatsuyuki Oikawa, Tokyo (JP)

(72) Inventor: Tatsuyuki Oikawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 76 days.

(21) Appl. No.: 15/236,598

(22) Filed: Aug. 15, 2016

(65) Prior Publication Data

US 2017/0053427 A1 Feb. 23, 2017

(30) Foreign Application Priority Data

Aug. 21, 2015 (JP) ................................ 2015-163715

(51) Int. Cl.
| | |
|---|---|
| *G06T 11/60* | (2006.01) |
| *H04L 29/06* | (2006.01) |
| *H04N 7/14* | (2006.01) |
| *H04N 7/15* | (2006.01) |

(52) U.S. Cl.
CPC .......... *G06T 11/60* (2013.01); *H04L 65/4015* (2013.01); *H04L 65/4046* (2013.01); *H04N 7/147* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 2006/0041564 A1 | 2/2006 | Jain et al. | |
| 2007/0198534 A1* | 8/2007 | Hon ................. | G06F 17/30058 |
| 2007/0216700 A1 | 9/2007 | Chen et al. | |
| 2010/0057566 A1* | 3/2010 | Itzhak ............... | G06F 17/30873 |
| | | | 705/14.53 |
| 2014/0160153 A1* | 6/2014 | Singh .................. | G06Q 10/101 |
| | | | 345/629 |
| 2014/0289650 A1* | 9/2014 | Cotlarciuc ............ | G06F 3/0481 |
| | | | 715/760 |
| 2015/0030316 A1 | 1/2015 | Oikawa | |
| 2015/0077369 A1 | 3/2015 | Nagahara et al. | |
| 2015/0149909 A1 | 5/2015 | Nakamura et al. | |
| 2015/0271214 A1 | 9/2015 | Oikawa | |

FOREIGN PATENT DOCUMENTS

| | | | |
|---|---|---|---|
| EP | 0684542 A1 * | 11/1995 | ........... G06F 3/0481 |
| JP | 2015-070345 | 4/2015 | |

OTHER PUBLICATIONS

Extended European Search Report dated Feb. 7, 2017 in Patent Application No. 16183913.9.

* cited by examiner

*Primary Examiner* — Yingchun He
(74) *Attorney, Agent, or Firm* — Oblon, McClelland, Maier & Neustadt, L.L.P.

(57) ABSTRACT

A display control apparatus obtains coordinate information indicating a specific coordinate on a display surface that a user activity is detected, determines whether a first image to be drawn at a position indicated by the coordinate information, at least partly overlaps a second image to be displayed together with the first image, and changes order information stored in a memory so as to cause the first image layer to be superimposed on the second image layer based on a determination indicating that the first image at least partly overlaps the second image.

13 Claims, 16 Drawing Sheets

FIG. 15A

TABLE 2

| STROKE DATA ID | START TIME | END TIME | COLOR | WIDTH | st001 COORDINATE ARRANGEMENT DATA ID | st002 COORDINATE ARRANGEMENT DATA ID | st003 COORDINATE ARRANGEMENT DATA ID |
|---|---|---|---|---|---|---|---|
| s001 | 20150522152202 | 20150522152205 | ff0000 | 2 | c001 | ... | ... |
| s002 | 20150522152612 | 20150522152615 | 000ff0 | 3 | c002 | ... | ... |
| s003 | 20150522152704 | 20150522152712 | ff0000 | 1 | c003 | ... | ... |
| ... | ... | ... | ... | ... | ... | ... | ... |

FIG. 15B

TABLE 3

| X COORDINATE | Y COORDINATE | DIFFERENCE TIME | c001 PRESSURE | c002 PRESSURE | c003 PRESSURE |
|---|---|---|---|---|---|
| 10 | 10 | 100 | 255 | | |
| 12 | 10 | 200 | 255 | | |
| 14 | 12 | 300 | 255 | | |
| ... | ... | ... | ... | ... | ... |

APPARATUS, SYSTEM, AND METHOD OF CONTROLLING DISPLAY OF IMAGE, AND RECORDING MEDIUM FOR CHANGING AN ORDER OR IMAGE LAYERS BASED ON DETECTED USER ACTIVITY

CROSS-REFERENCE TO RELATED APPLICATIONS

This patent application is based on and claims priority pursuant to 35 U.S.C. § 119(a) to Japanese Patent Application No. 2015-163715, filed on Aug. 21, 2015, in the Japan Patent Office, the entire disclosure of which is hereby incorporated by reference herein.

BACKGROUND

Technical Field

The present invention generally relates to an apparatus, system, and method of controlling display of image, and a recording medium.

Description of the Related Art

With the need for reducing costs or times associated with business trips, communication systems are widely used, which are capable of carrying out videoconferences among remotely located sites through a communication network such as the Internet. The communication systems enable transmission or reception of content data among a plurality of communication terminals. The content data may be display data such as an image of a videoconference participant or an image of presentation material, and stroke data reflecting drawings made by the participant.

For example, as described in Japanese Patent Application Publication No. 2015-70345-A1, the communication system may be provided with a server that allows the plurality of communication terminals to share stroke data, such as a drawing image drawn by the participant in the videoconference.

In some cases, the server additionally displays the other image, such as the image of presentation material, together with the drawing image. However, if the image of presentation material is set to be displayed over the drawing image, the drawing image such as a character dawn by the participant may be hidden by the image of presentation material.

SUMMARY

Example embodiments of the present invention include a display control apparatus and a display control method, each of which obtains coordinate information indicating a specific coordinate on a display surface that a user activity is detected, determines whether a first image to be drawn at a position indicated by the coordinate information, at least partly overlaps a second image to be displayed together with the first image, and changes order information stored in a memory so as to cause the first image layer to be superimposed on the second image layer based on a determination indicating that the first image at least partly overlaps the second image.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 15A and 15B are examples of table managed by the electronic whiteboard of the communication system of FIG. 1.

Figure 1:
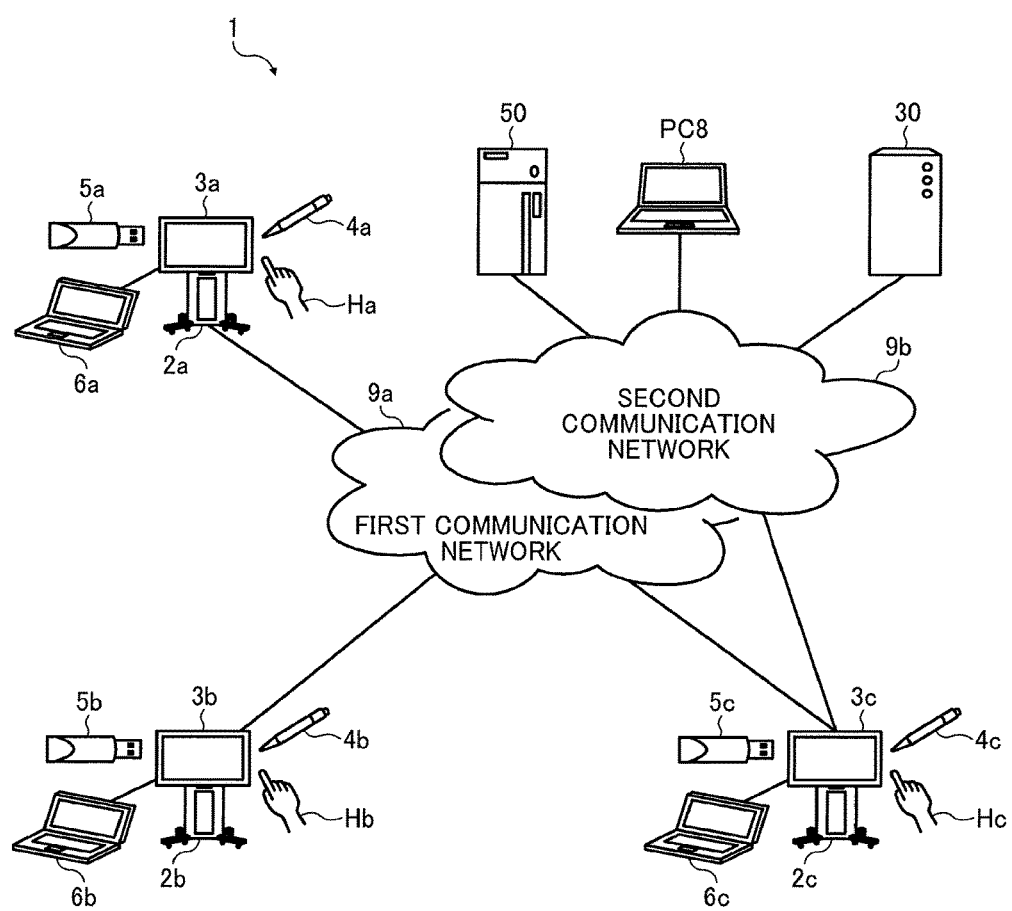
FIG. 1 is a schematic diagram illustrating a communication system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring to the drawings, embodiments of the present invention are described.

<Configuration of Communication System>

Referring to FIG. 1, a configuration of a communication system 1 is described according to an embodiment. FIG. 1 is a schematic diagram illustrating the communication system 1 according to the example embodiment.

The communication system 1 includes a plurality of electronic whiteboards 2a, 2b, and 2c, a personal computer (PC) 8, a relay device 30, and a communication management system 50.

The electronic whiteboards 2a, 2b, and 2c are connected via a first communication network 9a to be communicable with one another. The electronic whiteboards 2a, 2b, and 2c are respectively provided with displays 3a, 3b, and 3c.

The electronic whiteboards 2a, 2b, and 2c respectively cause the displays 3a, 3b, and 3c to display drawing images, drawn with electronic pens 4a, 4b, and 4c or the user's hands Ha, Hb, and Hc. For simplicity, any arbitrary one of the electronic whiteboards 2a, 2b, and 2c is referred to as the electronic whiteboard 2. Similarly, any arbitrary one of the displays 3a, 3b, and 3c is referred to as the display 3. Any arbitrary one of the electronic pens 4a, 4b, and 4c is referred to as the electronic pen 4. Any arbitrary one of the user's hands Ha, Hb, and Hc is referred to as the hand H. Further, the electronic whiteboard 2 may change the drawing image being displayed on the display 3, according to an event made by the user's hand H. For example, in response to the user's gesture indicating size enlargement, size reduction, or turning pages, the electronic whiteboard 2 changes the image size or switches a screen.

The electronic whiteboards 2a, 2b, and 2c are respectively connectable to the universal serial bus (USB) memories 5a, 5b, and 5c. The electronic whiteboards 2a, 2b, and 2c may read or write electronic files, which may be written in portable document format (PDF), onto or from the USB memories 5a, 5b, and 5c. The electronic whiteboards 2a, 2b, and 2c are respectively connected to note PCs 6a, 6b, and 6c, via cables, to be communicable in compliance with the standard such as DisplayPort, Digital Visual Interface (DVI), High-Definition Multimedia Interface (HDMI; Registered Trademark), or Video Graphics Array (VGA). Any one of the USB memories 5a, 5b, and 5c is referred to as the USB memory 5. Any one of the note PCs 6a, 6b, and 6c is referred to as the note PC 6.

The stroke data, which is the drawing image drawn on the display 3, captured at a first site is transmitted to a second site through the first communication network 9a for output through the display 3 at the second site. Similarly, the stroke data, which is the drawing image drawn on the display 3 at the second site, is transmitted to the first site through the first communication network 9a for output through the display 3 at the first site. As described above, the drawing images can be shared among remotely located sites, such that the communication system 1 with the electronic whiteboards 2 can facilitate a videoconference.

In addition to the electronic whiteboard 2, the drawing images, such as stroke data, can be shared by any desired communication terminal connected to the first communication network 9a. Examples of such communication terminal include, PC, videoconference terminal, tablet, smart phone, digital signage, telestrator, image processing apparatus, portable information processing device, digital video camera, digital still camera, and game machine. The telestrator may be used for providing information on sports or weather. The image processing apparatus may be used to provide a remote medical diagnosis system. The game machine may be one example of any terminal capable of providing a frame of image data.

The electronic whiteboard 2c, the PC 8, the relay device 30, and the management system 50 are connected via a second communication network 9b to be communicable with one another.

The electronic whiteboard 2c and the PC 8 communicate with each other to transmit or receive display data, such as data of a presentation material, as an example of content data. The display data is any image data that can be displayed on a display, such as an image captured at one site during videoconference. More specifically, the display data may be a video image or a still image, or both of the video image and the still image.

The relay device 30 relays content data, such as display data, between the electronic whiteboard 2c and the PC 8 through the second communication network 9b. The management system 50 centrally manages communicates states of the electronic whiteboard 2c and the PC 8.

While the electronic whiteboard 2c and the PC 8 are connected to the second communication network 9b in this example, any other communication terminal may be connected to the second communication network 9b to share display data with the electronic whiteboard 2c and the PC 8. Examples of such communication terminal include, but not limited to, videoconference terminal, tablet, smart phone, digital signage, telestrator, image processing apparatus, portable information processing terminal, digital video camera, digital still camera, and game machine.

In this embodiment, the electronic whiteboard 2c activates a module for sharing stroke data, and a module for sharing display data, to share stroke data and display data among the communication terminals.

In one example, the first communication network 9a is the Intranet, and the second communication network 9b is the Internet. The communication networks 9a and 9b may be previously determined according to communications protocol of the communication terminals in the communication system 1, and may be selected from the Internet, local area network (LAN), the Intranet, and mobile phone network. The communication networks 9a and 9b may be the same communication network, such as the Internet.

The example illustrated in FIG. 1 uses the USB memory 5 as a memory attachable to the electronic whiteboard 2; however, any desired memory may be used such as a SD card.

<Hardware Configuration of Electronic Whiteboard>

Figure 2:
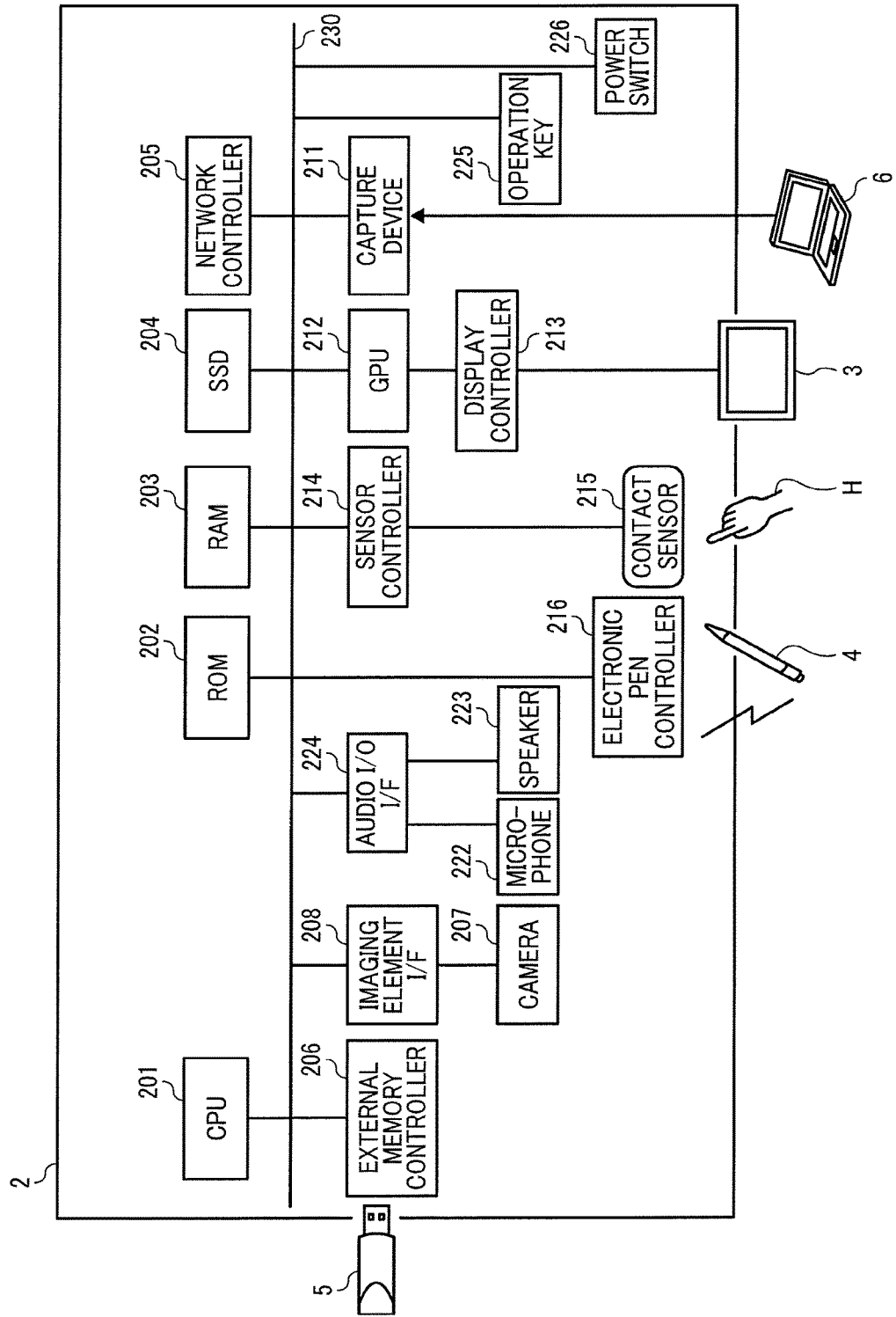
FIG. 2 is a schematic block diagram illustrating a hardware configuration of an electronic whiteboard of the communication system of FIG. 1.

FIG. 2 illustrates a hardware configuration of the electronic whiteboard 2, according to the embodiment. FIG. 2 is a schematic block diagram illustrating a hardware configuration of the electronic whiteboard 2 illustrated in FIG. 1.

As illustrated in FIG. 2, the electronic whiteboard 2 includes a central processing unit (CPU) 201 that controls entire operation of the electronic whiteboard 2, a read only memory (ROM) 202 that stores a program for operating the CPU 201 such as an initial program loader (IPL), a random access memory (RAM) 203 that operates as a work area for the CPU 201, a solid state drive (SSD) 204 that controls reading or writing of various types of data including control program stored in a memory, a network controller 205 that controls communication via the communication network 9a or 9b, and an external memory controller 206 that controls communication with the USB memory 5. The electronic whiteboard 2 further includes a camera 207 that captures an object under control of the CPU 201, an imaging element I/F 208 that controls operation of the camera 207, a capture device 211 that transmits image data (still or moving image) for display at the note PC 6, a graphics processing unit (GPU) 212 that processing graphics, and a display controller 213 that controls transmission of image data output from the GPU 212 to the display 3. The electronic whiteboard 2 further includes a sensor controller 214 and a contact sensor 215. The sensor controller 214 controls operation of the contact sensor 215. The contact sensor 715 detects a touch onto the display 3 with the electronic pen 4 or the user's hand H. In this example, the contact sensor 215 senses a touch input to a specific coordinate on the display 3 using the infrared blocking system. More specifically, the display 3 is provided with two light receiving elements disposed on both upper side ends of the display 3, and a reflector frame. The light receiving elements emit a plurality of infrared rays in parallel to a touch panel of the display 3. The light receiving elements receive lights passing in the direction that is the same as an optical path of the emitted infrared rays, which are reflected by the reflector frame. The contact sensor 215 outputs an identifier (ID) of the infrared ray that is blocked by an object (such as the user's hand) after being emitted from the light receiving elements, to the sensor controller 214. Based on the ID of the infrared ray, the sensor controller 214 detects a specific coordinate that is touched.

The contact sensor 215 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. Alternatively, the contact sensor 215 may identify the contact position using the camera 207.

The electronic whiteboard 2 further includes an electronic pen controller 216. The electronic pen controller 216 communicates with the electronic pen 4 to detect a touch by the tip or bottom of the pen 4 to the display 3. In addition or in alternative to detecting a touch by the tip or bottom of the pen 4, the electronic pen controller 216 may also detect a touch by another part of the electronic pen 4, such as a part held by a hand.

The electronic whiteboard 2 further includes a microphone 222 that inputs audio, a speaker 223 that outputs audio, an audio input/output I/F 224 that processes input or output of audio signals between the microphone 222 and the speaker 223 under control of the CPU 201, operation key(s) 225 that receives user inputs, and a power switch 226 that turns on or off the electronic power of the electronic whiteboard 2.

The electronic whiteboard 2 further includes a bus line 230, such as an address bus or a data bus, which electrically connects the elements illustrated in FIG. 2.

The control program for the electronic whiteboard 2 may be stored on a computer-readable recording medium such as a CD-ROM for distribution, or stored on a server on any desired network to be downloaded.

<Hardware Configuration of Communication Management System>

Figure 3:
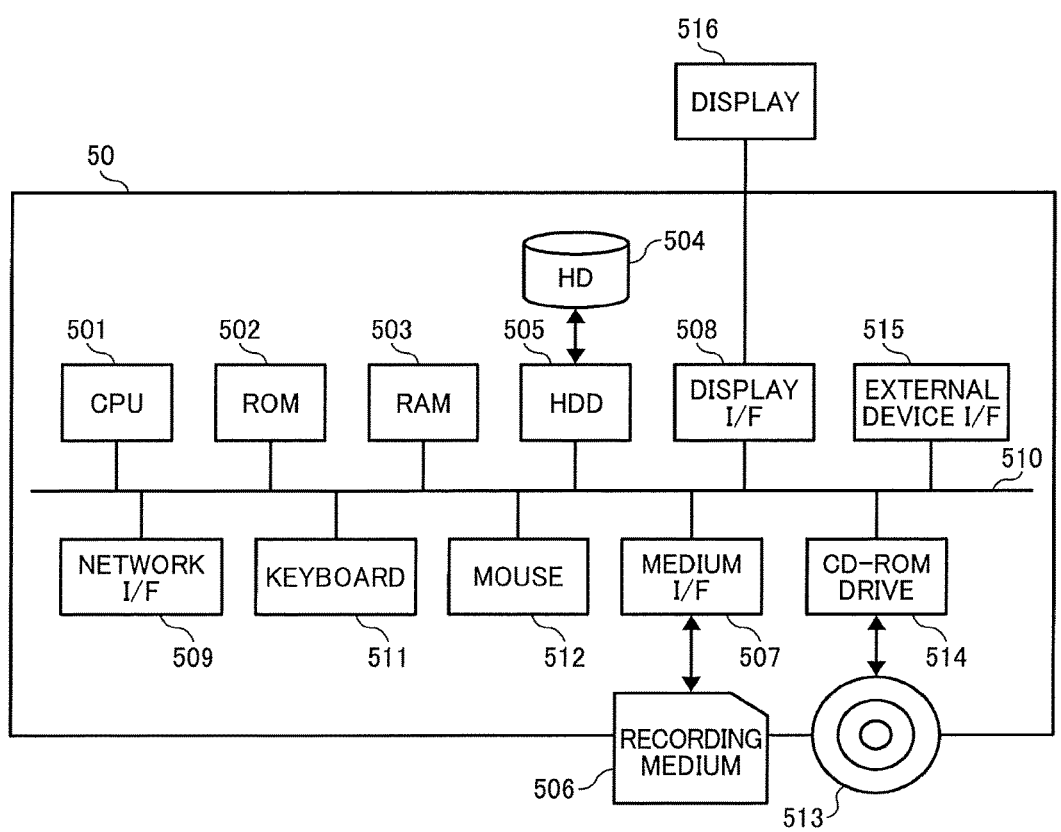
FIG. 3 is a schematic block diagram illustrating a hardware configuration of a communication management system of the communication system of FIG. 1.

Referring to FIG. 3, a hardware configuration of the communication management system 50 is described according to an embodiment of the present invention. FIG. 3 is a schematic block diagram illustrating a hardware configuration of the communication management system 50 according to the embodiment.

The management system 50 includes a CPU 501 that controls entire operation of the management system 50, a ROM 502 that stores a communication control program, a RAM 503 that operates as a work area for the CPU 501, a hard disk (HD) 504 that stores various data, a HDD 505 that controls reading or writing of various data from or to the HD 504 under control of the CPU 501, and a medium I/F 507 that controls reading or writing of data with respect to a recording medium 506 such as a flash memory. The management system 50 further includes a display I/F 508 that displays various information on a display 516 such as a curser, menu, window, character, or image, a network I/F 509 that controls transmission of data through the communication network 9a or 9b, a keyboard 511 provided with a plurality of keys for inputting a character, numeral, or instruction, and a mouse 512 that selects or executes an instruction through selection of a processing target or movement of a mouse curser. The management system 50 further includes a CD-ROM drive 514 that controls reading or writing with respect to a CD-ROM 513 as an example of removable memory, an external device I/F 515 that controls transmission of various data with an external device, and a bus line 510, such as an address bus or a data bus, that electrically connects the elements illustrated in FIG. 3.

Note that the communication control program may be recorded in a file in a format installable or executable on a computer-readable recording medium such as the recording medium 506 or the CD-ROM 513 for distribution. The communication control program may be stored on the HD 504.

<Hardware Configuration of PC>

Figure 4:
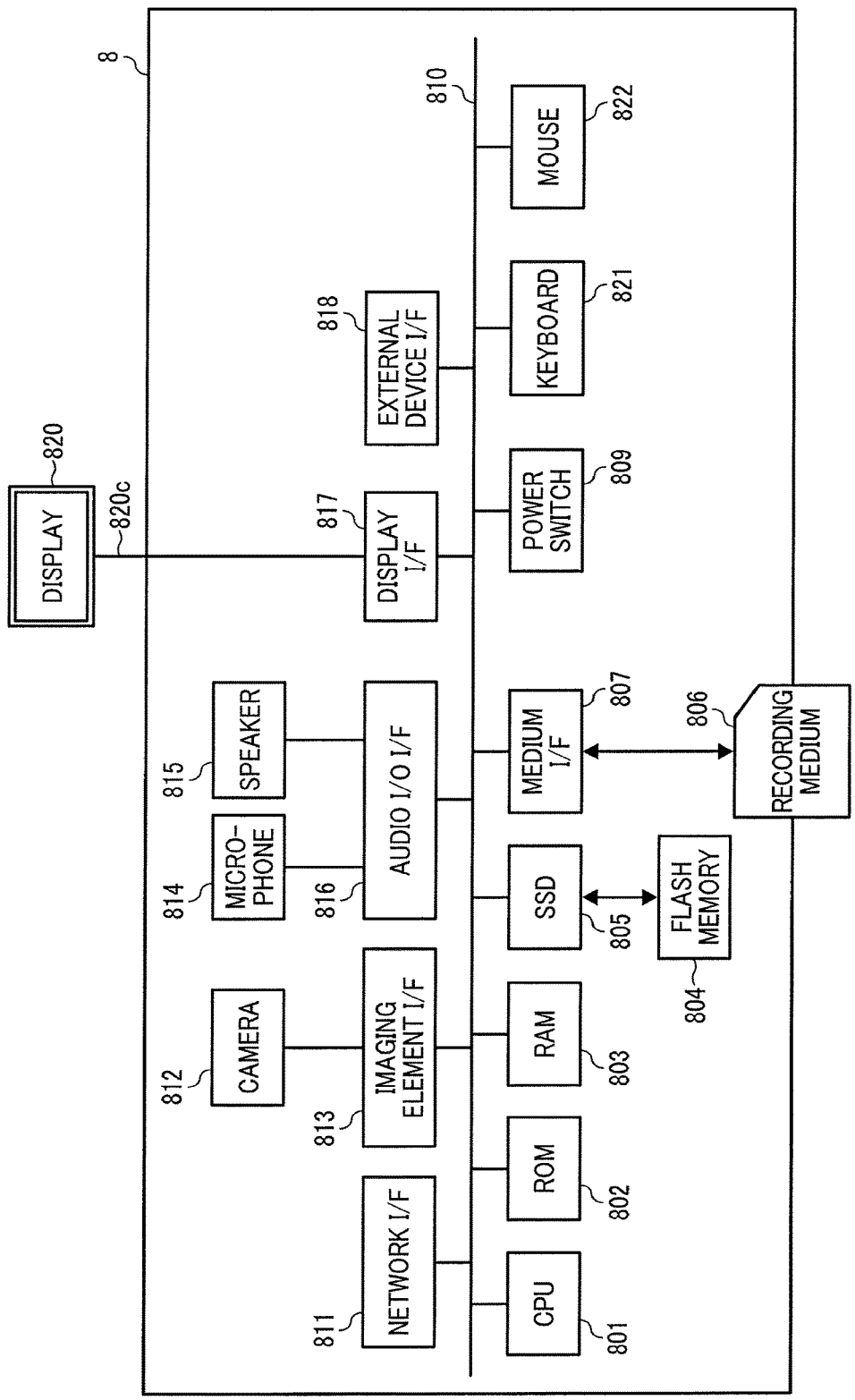
FIG. 4 is a schematic block diagram illustrating a hardware configuration of a personal computer (PC) operating as a videoconference terminal, according to an embodiment of the present invention.

FIG. 4 illustrates a hardware configuration of the PC 8, as an example of videoconference terminal, according to the embodiment. The PC 8 includes a central processing unit (CPU) 801, a read only memory (ROM) 802, a random access memory (RAM) 803, a flash memory 804, a solid state drive (SSD) 805, a medium interface (I/F) 807, a power switch 809, a bus line 810, a network I/F 811, a camera 812, an imaging element I/F 813, a microphone 814, a speaker 815, an audio input/output I/F 816, a display I/F 817, an external device I/F 818, a keyboard 821, and a mouse 822. The CPU 801 controls entire operation of the PC 8. The ROM 802 stores a control program for operating the CPU 801 such as an Initial Program Loader (IPL). The RAM 803 is used as a work area for the CPU 801. The flash memory 804 stores various data such as a communication control program, display data, and audio data. The SSD 805 controls reading or writing of various data with respect to the flash memory 804 under control of the CPU 801. In alternative to the SSD, a hard disk drive (HDD) may be used. The medium I/F 807 controls reading or writing of data with respect to a recording medium 806 such as a flash memory.

The network I/F 811 controls communication of data with an external device through the second communication network 9b. The camera 812 is an example of imaging device capable of capturing an object under control of the CPU 801, and is incorporated in the PC 8. The imaging element I/F 813 is a circuit that controls driving of the camera 812. The microphone 814 is an example of audio collecting device capable of inputting audio under control of the CPU 801, and is incorporated in the PC 8. The audio I/O I/F 816 is a circuit for inputting or outputting an audio signal between the microphone 814 and the speaker 815 under control of the CPU 801. The display I/F 817 is a circuit for transmitting display data to the external display 820 under control of the CPU 801. The external device I/F 818 is an interface circuit that connects the PC 8 to various external devices. The keyboard 821 is one example of input device provided with a plurality of keys for allowing a user to input characters, numerals, or various instructions. The mouse 812 is one example of input device for allowing the user to select a specific instruction or execution, select a target for processing, or move a curser being displayed.

The bus line 810 is an address bus or a data bus, which electrically connects the elements in FIG. 4 such as the CPU 801.

The display 820 may be a liquid crystal or organic electroluminescence (EL) display that displays an image of a subject, an operation icon, or the like. The display 820 is connected to the display I/F 817 by a cable 820c. The cable 820c may be an analog red green blue (RGB) (video graphic array (VGA)) signal cable, a component video cable, a high-definition multimedia interface (HDMI) signal cable, or a digital video interactive (DVI) signal cable.

The camera 812 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used. The external device I/F 818 is capable of connecting an external device such as an external camera, an external microphone, or an external speaker through a Universal Serial Bus (USB) cable or the like. In the case where an external camera is connected, the external camera is driven in preference to the built-in camera 812 under control of the CPU 801. Similarly, in the case where an external microphone is connected or an external speaker is connected, the external microphone or the external speaker is driven in preference to the built-in microphone 814 or the built-in speaker 815 under control of the CPU 801.

The recording medium 806 is removable from the PC 8. The recording medium 801 can be any non-volatile memory that reads or writes data under control of the CPU 801, such that any memory such as an electrically erasable and programmable read-only memory (EEPROM) may be used instead of the flash memory 804.

<Software Configuration>

Figure 5A:
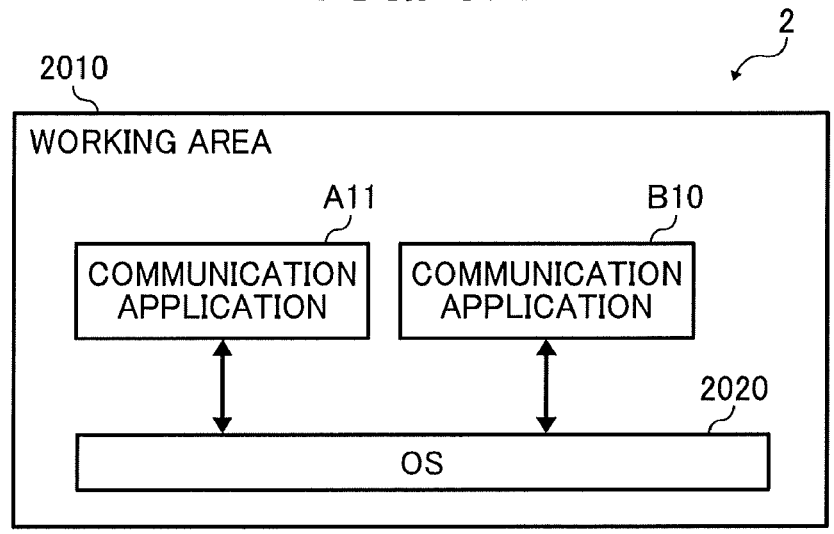
FIG. 5A is a schematic block diagram illustrating a software configuration of the electronic whiteboard of FIG. 2, according to an embodiment of the present invention.

FIG. 5A is a schematic block diagram illustrating a software configuration of the electronic whiteboard 2 of FIG. 2, according to an embodiment of the present invention. As illustrated in FIG. 5A, the electronic whiteboard 2 is installed with an operating system (OS) 2020, first communication application A11, and second communication application B10, each of which operates on a work area 2010 of the RAM 203.

The OS 2020 is basic software that controls entire operation of the electronic whiteboard 2 through providing basic functions. The communication application A11 and B10 each enable the electronic whiteboard 2 to communicate with the other electronic whiteboard (or communication terminal), using different communication protocols. The first communication application A11 provides the electronic whiteboard 2 with a communication control function of controlling transmission of stroke data with the other communication terminal, and an image processing function of outputting stroke data as an image. The second communication application B10 provides the electronic whiteboard 2 with a communication control function of controlling transmission of display data, such as data of a presentation material, with the other communication terminal. The second communication application B10 does not provide the image processing function of outputting display data. The second communication application B10 may be prepared, for example, by removing the image processing function from third communication application B11, described below, which includes the communication control function and the image processing function.

The OS 2020 and the first communication application A11 are installed onto the electronic whiteboard 2 before shipment. The second communication application B10 may be installed onto the electronic whiteboard 2, after shipment. In the following, it is assumed that the electronic whiteboard 2c is installed with the second communication application B10, and the electronic whiteboards 2a and 2b are not installed with the second communication application B10.

Figure 5B:
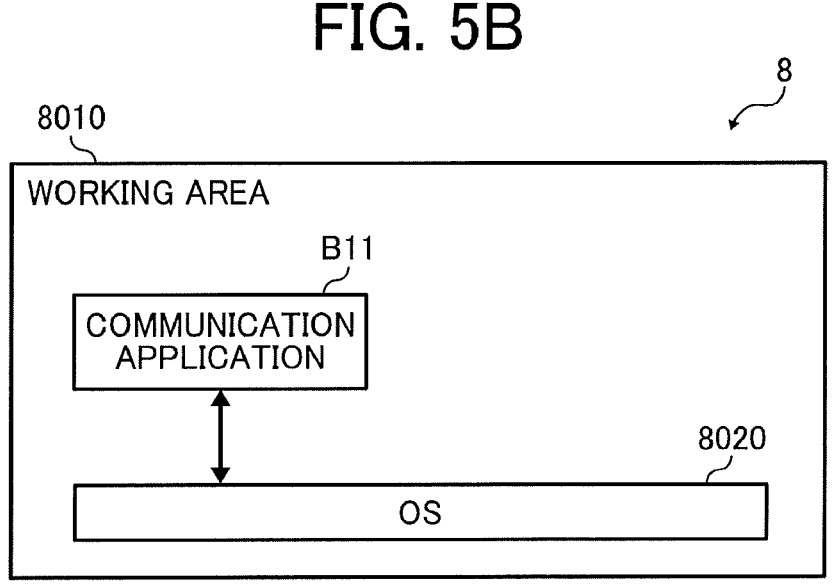
FIG. 5B is a schematic block diagram illustrating a software configuration of the PC of FIG. 4, according to an embodiment of the present invention.

FIG. 5B is a schematic block diagram illustrating a software configuration of the PC 8 of FIG. 4, according to the embodiment. As illustrated in FIG. 5B, the PC 8 is installed with operating system (OS) 8020, and the third communication application B11, which may be deployed on a working area 8010 of the RAM 803.

The OS 8020 is basic software that controls entire operation of the PC 8 through providing basic functions. The third communication application B11 provides the PC 8 with the communication control function of controlling transmission of display data with the other communication terminal, and the image processing function of outputting display data as an image.

The OS 8020 and the third communication application B11 are installed onto the PC 8 before or after shipment.

<Functional Configuration of Communication System>

Figure 6:
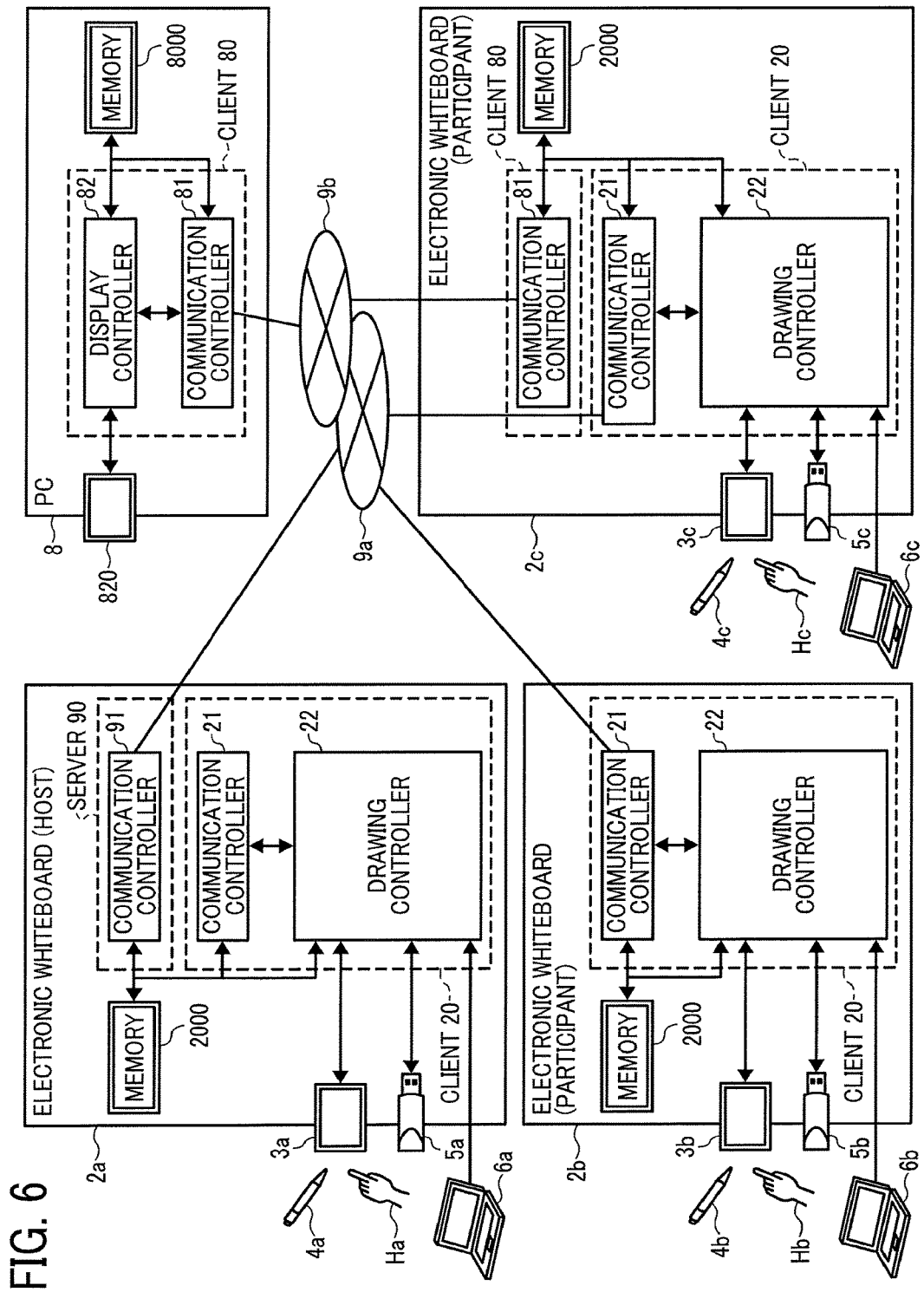
FIG. 6 is a schematic block diagram illustrating a functional configuration of the electronic whiteboard and the PC of the communication system of FIG. 1.

Now, a functional configuration of the communication system 1 is described according to an embodiment of the present invention. FIG. 6 is a schematic block diagram illustrating a functional configuration of the electronic whiteboard 2 and the PC 8 of the communication system of FIG. 1. In FIG. 6, the electronic whiteboards 2a, 2b, and 2c are connected through the first communication network 9a to transmit or receive data. Further, in FIG. 6, the electronic whiteboards 2c and the PC 8 are connected through the second communication network 9b to transmit or receive data.

The electronic whiteboard 2 includes hardware of FIG. 2, which operates in cooperation with the control program, to implement the functional configuration of FIG. 6. The electronic whiteboard 2 includes a memory 2000 implemented by the SSD 204. The PC 8 includes the hardware of FIG. 4, which operates in cooperation with the control program, to implement the functional configuration of FIG. 6. The PC 8 includes a memory 8000 implemented by the SSD 805.

The electronic whiteboard 2 may function as a "host terminal" that requests to start communication to share images, or a "participant terminal" that participates in communication started by the host terminal. The electronic whiteboard 2 mainly includes a client section ("client") 20 and a server section ("server") 90. The client 20 and the server 90 are functions performed by one electronic whiteboard 2, with activation of the first communication application A11. Alternatively, the electronic whiteboard 2 may only function as the client 20, while causing other apparatus such as a distribution control apparatus to operate as the server 90.

In case the electronic whiteboard 2 operates as the host terminal, such electronic whiteboard 2 implements both of the client 20 and the server 90. In case the electronic whiteboard 2 operates as the participant terminal, such electronic whiteboard 2 implements the client 20 but not the server 90. For example, in case the electronic whiteboard 2a operates as the host terminal, and the electronic whiteboards 2b and 2c each operate as the participant terminal, the client 20 of the electronic whiteboard 2a communicates with the client 20 of each of the electronic whiteboards 2b and 2c, through the server 90 in the electronic whiteboard 2a. The client 20 of each one of the electronic whiteboards 2b and 2c communicates with the client 20 of the electronic whiteboard 2a, 2b, or 2c, through the server 90 in the electronic whiteboard 2a.

The electronic whiteboard 2b and the PC 8 implement the client 80, with activation of the second communication application B10 and the third communication application B11, respectively. The client 80 communicates with the other communication terminal via the relay device 30, through a communication session established based on a call control by the management system 50 operating as a server.

The client 20 includes a communication controller 21 and a drawing controller 22.

The communication controller 21, which may be implemented by the instructions of the CPU 201, or the network controller 205, controls communication with the other electronic whiteboard 2 or a communication controller 91 of the server 90, through the first communication network 9a.

The drawing controller 22, which may be implemented by the instructions of the CPU 201, performs image processing on stroke data that is generated in response to operation on the display 2, or various data obtained from any desired device. Examples of such device include, but not limited to, the USB memory 5, the note PC 6, the communication controller 21, and the memory 2000. The drawing controller 22 generates an image layer based on the processed image data, and controls output of a combined image on which a plurality of image layers are superimposed one above the other.

Figure 7:
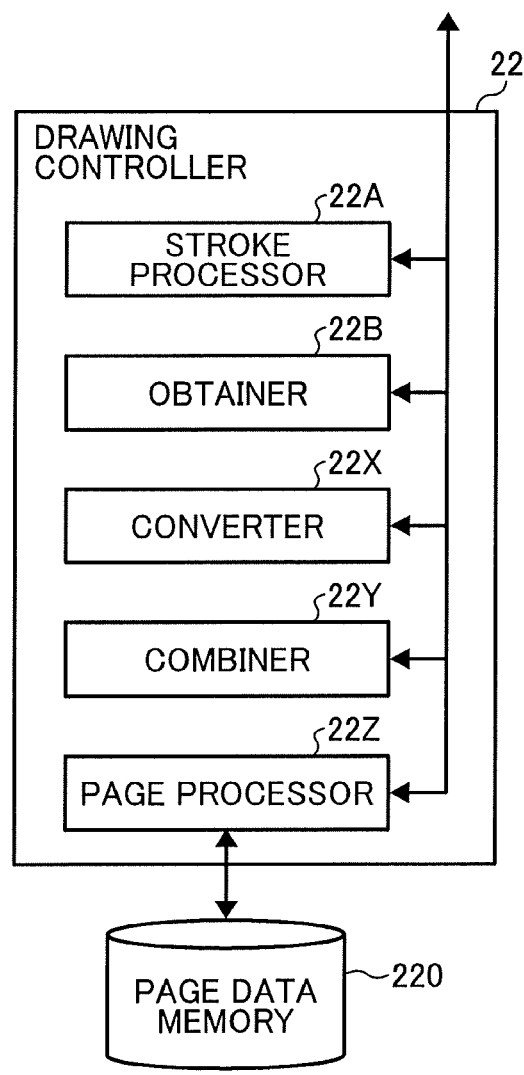
FIG. 7 is a schematic block diagram illustrating a drawing controller of the electronic whiteboard of FIG. 5, according to an embodiment of the present invention.

FIG. 7 illustrates a functional configuration of the drawing controller 22 according to an embodiment. The drawing controller 22 includes a stroke processor 22A, an obtainer 22B, a converter 22X, a combiner 22Y, and a page processor 22Z.

The stroke processor 22A, which may be implemented by the instructions of the CPU 201, generates stroke data that reflects the user's drawing on the display 3 with the electronic pen 4 or the user's hand H. More specifically, the stroke data may be a character, mark, or any other drawing, which may be drawn by the user.

The obtainer 22B, which may be implemented by the instructions of the CPU 201, obtains data stored in the memory 2000.

The converter 22X, which may be implemented by the instructions of the CPU 201, converts various data. For example, the converter 22X performs textization, real (binary) data conversion, serialization, deserialization, encoding, and decodring.

The combiner 22Y, which may be implemented by the instructions of the CPU 201, generates an image layer based on each type of data, and cause those image layers to be superimposed one above the other. Examples of image data types include a user interface (UI) data, stroke data, medium data (display data), and background image data. The UI data is used for generating a user interface, which includes, for example, a message for display to the user and an icon for selection by the user. The background image data is used for generating a background image, such as a frame to be used for defining a layout of the image. The stroked data and the medium data are described below in detail.

The page processor 22Z, which may be implemented by the instructions of the CPU 201, associates the stroke data and the display data for the same one page, and stores this set of stroke data and display data in a page data memory 220 of the memory 2000.

The page data memory 220 is a memory area of the memory 2000, which stores page data as described in Table 1. Table 1 illustrates an example data structure of page data. The page data includes one-page data to be displayed on the display 2, which includes stroke arrangement data (items of stroke data for one character, etc.), and medium data as an example of display data.

TABLE 1

| PAGE DATA ID | START TIME | END TIME | STROKE ARRANGEMENT DATA ID | MEDIUM DATA ID |
|---|---|---|---|---|
| S001 | 20150522152034 | 20150522152402 | st001 | m001 |
| S002 | 20150522152415 | 2015522152825 | st002 | m002 |
| S003 | 20150522153345 | 20150522154033 | st003 | m003 |
| . . . | . . . | . . . | . . . | . . . |

The page data includes a page data ID for identifying a specific page, start time when display of that page is started, end time when drawing to that page by a stroke drawing or a gesture is stopped, a stroke arrangement data ID for identifying stroke arrangement data, and a medium data ID for identifying medium data. The stroke arrangement data is to be used for displaying a set of stroke drawings on the display 3, as the stroke drawings are made by the user with the electronic pen 4 or the user's hand H. The medium data is to be used for displaying the other image (referred to as the display data) on the display 3, together with the stroke drawing.

The stroke arrangement data includes various information as illustrated in Table 2 (FIG. 15A). Table 2 illustrates an example data structure of stroke arrangement data. As illustrated in Table 2, one stroke arrangement data, identified with the stroke arrangement data ID in Table 1, includes a plurality of items of stroke data, each corresponding to a stroke drawing. Each stroke data includes a stroke data ID for identifying that stroke data, start time when drawing of that stroke starts, end time when drawing of that stroke ends, a color of the stroke, a width of the stroke, and a coordinate arrangement data ID for identifying arrangement of points of the stroke. For example, in case the user draws the alphabet "S" with the electronic pen 4 in one stroke, one stroke data ID is assigned to that stroke drawing "S". In case the user draws the alphabet "T" with the electronic pen 4 in two strokes, two stroke data IDs are assigned to those two stroke drawings "T".

The coordinate arrangement data includes various information as illustrated in Table 3 (FIG. 15B). Table 3 illustrates an example data structure of the coordinate arrangement data. The coordinate arrangement data includes a single point (X coordinate value, Y coordinate value) on the display 3, difference time (ms) indicating a difference between the time when that point is drawn and the start time when drawing of the stroke starts, and pressure by the electronic pen 4 on that single point. That is, one item of coordinate arrangement data in Table 2 is a collection of single points in Table 3. For example, in case the user draws the alphabet "S" with the electronic pen 4 in one stroke, a plurality of points will be drawn, such that the coordinate arrangement data assigned with a specific data ID (such as, c001) corresponds to those points in the stroke drawing that are managed with Table 3.

The medium data of the page data in Table 1 includes various information as illustrated in Table 4. Table 4 illustrates an example data structure of medium data. As illustrated in Table 4, the medium data includes a medium data ID for identifying the medium data as managed with Table 1, a type of the medium data, recording time when the medium data is recorded, a position of an image to be displayed on the display 3 based on the medium data (X coordinate, Y coordinate), a size of the image (width, height), and data indicating content of the medium data. The position of the image to be displayed based on the medium data is defined by the upper left corner of that image, when the X and Y coordinates of the upper left corner of the display 3 are set to (0, 0).

TABLE 4

| MEDIUM DATA ID | DATA TYPE | RECORDING TIME | X | Y | WIDTH | HEIGHT | DATA |
|---|---|---|---|---|---|---|---|
| m001 | IMAGE | 20150522152632 | 1400 | 50 | 400 | 300 | abc.jpg |
| ... | ... | ... | ... | ... | ... | ... | ... |

In one example, the page data memory 220 stores a priority order in displaying, for each one of a user interface (UI) image layer generated based on the UI data, an output image layer generated based on the medium data, a stroke image layer generated based on the stroke data, and a background image layer generated based on the background image data. Table 5 illustrates an example of priority order set by default. In the following table, the priority order of "1" indicates the top layer, while the priority order of "4" indicates the bottom layer. According to the default priority order, above the background image layer, the stroke image layer, the output image layer, and the UI image layer are superimposed one above the other in this order to generate a combined image.

TABLE 5

| PRIORITY | LAYER |
|---|---|
| 1 | UI IMAGE LAYER |
| 2 | OUTPUT IMAGE LAYER |
| 3 | STROKE IMAGE LAYER |
| 4 | BACKGROUND IMAGE LAYER |

The server 90 includes a communication controller 91.

The communication controller 91, which may be implemented by the instructions of the CPU 201, controls communication with the communication controller 21 of the client 20. As described above, the client 20 may be the client 20 in the same electronic whiteboard 2, or the client 20 in the external electronic whiteboard 2 that is communicable via the first communication network 9a.

The communication controller 81 of the client 80, which may be implemented by the instructions of the CPU 201 or 801, and the network controller 205 or the network I/F 811, controls communication with the communication controller 81 of the client 80 in the external electronic whiteboard 2.

The display controller 82 of the client 80 is implemented by the instructions from the CPU 801, which is generated with activation of the third communication application B11. The display controller 82 performs image processing based on data obtained from the communication controller 21 or the memory 8000, and controls output of processed image data.

<Operation>

Referring now to FIGS. 8 to 12, operation of controlling display of various data during videoconference is described according to an embodiment.

Figure 8:
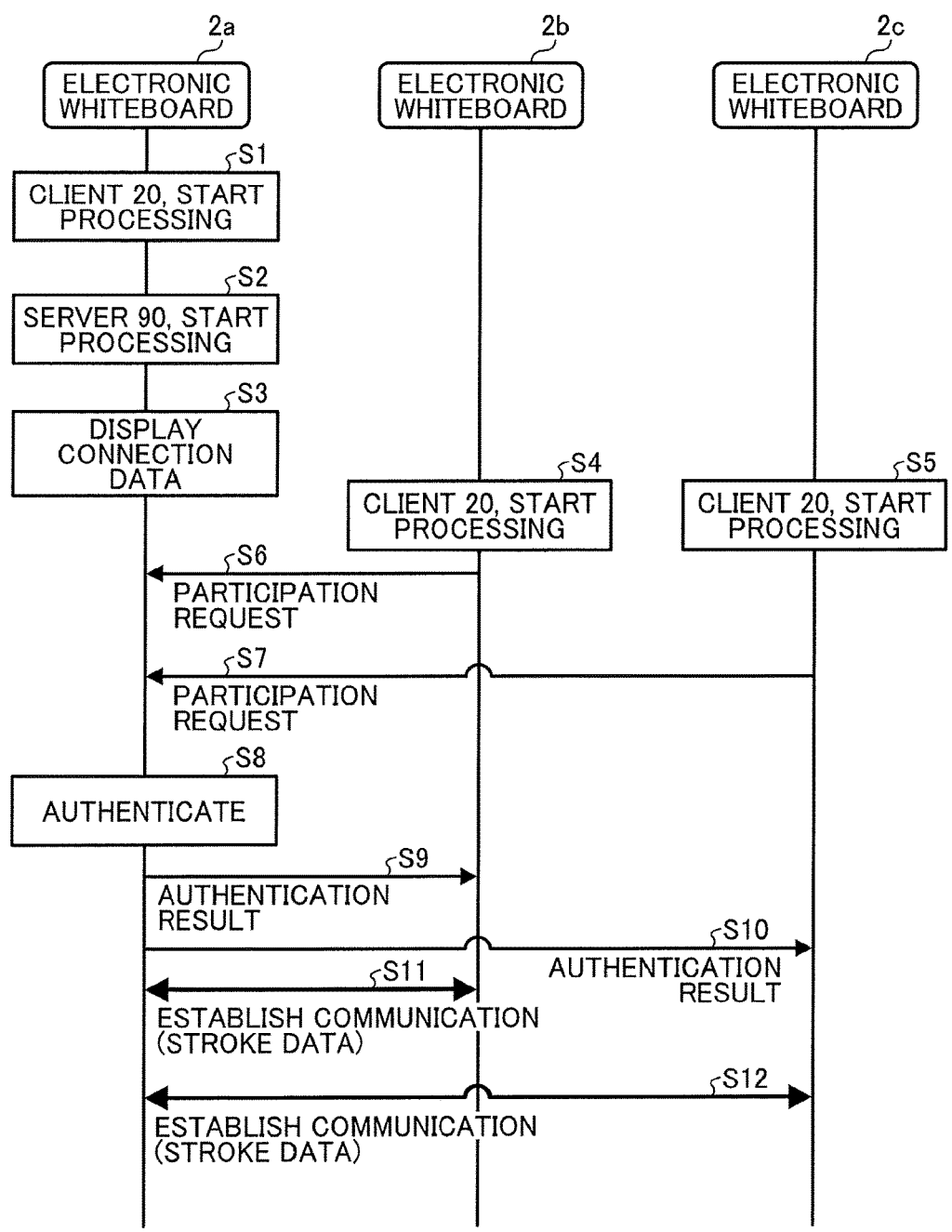
FIG. 8 is a data sequence diagram illustrating operation of establishing communication among the electronic whiteboards of FIG. 1, according to an embodiment of the present invention.

Referring to FIG. 8, operation of establishing communication among the electronic whiteboards 2a, 2b, and 2c, with the communication application A11, is described according to the embodiment. As the power switch 226 of the electronic whiteboard 2a is turned on by the user, the first communication application A11 is activated to start processing by the client 20 of the electronic whiteboard 2a (S1). In response to receiving a request for starting a conference through operation onto the display 3a, the communication controller 21 of the client 20 transmits an instruction to start processing by the server 90, to the communication controller 91 of the server 90 in the same electronic whiteboard 2a. Accordingly, the electronic whiteboard 2a is able to start various processing by the server 90, in addition to processing by the client 20 (S2).

The communication controller 91 of the electronic whiteboard 2a generates connection data to be used for establishing connection with the electronic whiteboard 2a The client 20 causes the display 3a to display the generated connection data (S3). The connection data includes the IP address of the host terminal, and a pass code that is generated for the communication session to be established for image sharing. The pass code, which is generated, is stored in the memory 2000. The user at the electronic whiteboard 2a, who now knows the connection data, informs the other users at the electronic whiteboards 2b and 2c of that connection data through telephone or electronic mail.

As the user at the electronic whiteboard 2b turns on the power switch 226, the communication application A11 is activated to start processing of the client 20 in the electronic whiteboard 2b (S4). Similarly, as the user at the electronic whiteboard 2c turns on the power switch 226, the communication application A11 is activated to start processing of the client 20 in the electronic whiteboard 2c (S5). In response to a user input to the display 3*b* that requests connection, the communication controller 21 of the client 20 in the electronic whiteboard 2*b* transmits a participation request, with the pass code, to the communication controller 91 of the server 90 in the electronic whiteboard 2*a* (S6). Similarly, the electronic whiteboard 2*c* transmits a participation request, with the pass code, to the electronic whiteboard 2*a* (S7). The communication controller 91 of the electronic whiteboard 2*a* receives the participation requests (with the pass code), respectively, from the electronic whiteboards 2*b* and 2*c*.

Next, the communication controller 91 authenticates the electronic whiteboards 2*b* and 2*c*, based on a match between the pass codes that are received from the electronic whiteboards 2*b* and 2*c*, and the pass code stored in the memory 2000 (S8). The communication controller 91 transmits authentication results to the clients 90 of the electronic whiteboards 2*b* and 2*c* (S9, S10). When the authentication result indicates that the electronic whiteboards 2*b* and 2*c* are authenticated, the electronic whiteboard 2*a* that operates as the host terminal establishes a communication, respectively, with the electronic whiteboard 2*b* and electronic whiteboard 2*c* that operate as participant terminals (S11, S12). In the following, it is assumed that content data transmitted among the electronic whiteboards 2*a*, 2*b*, and 2*c* include stroke data.

Figure 9:
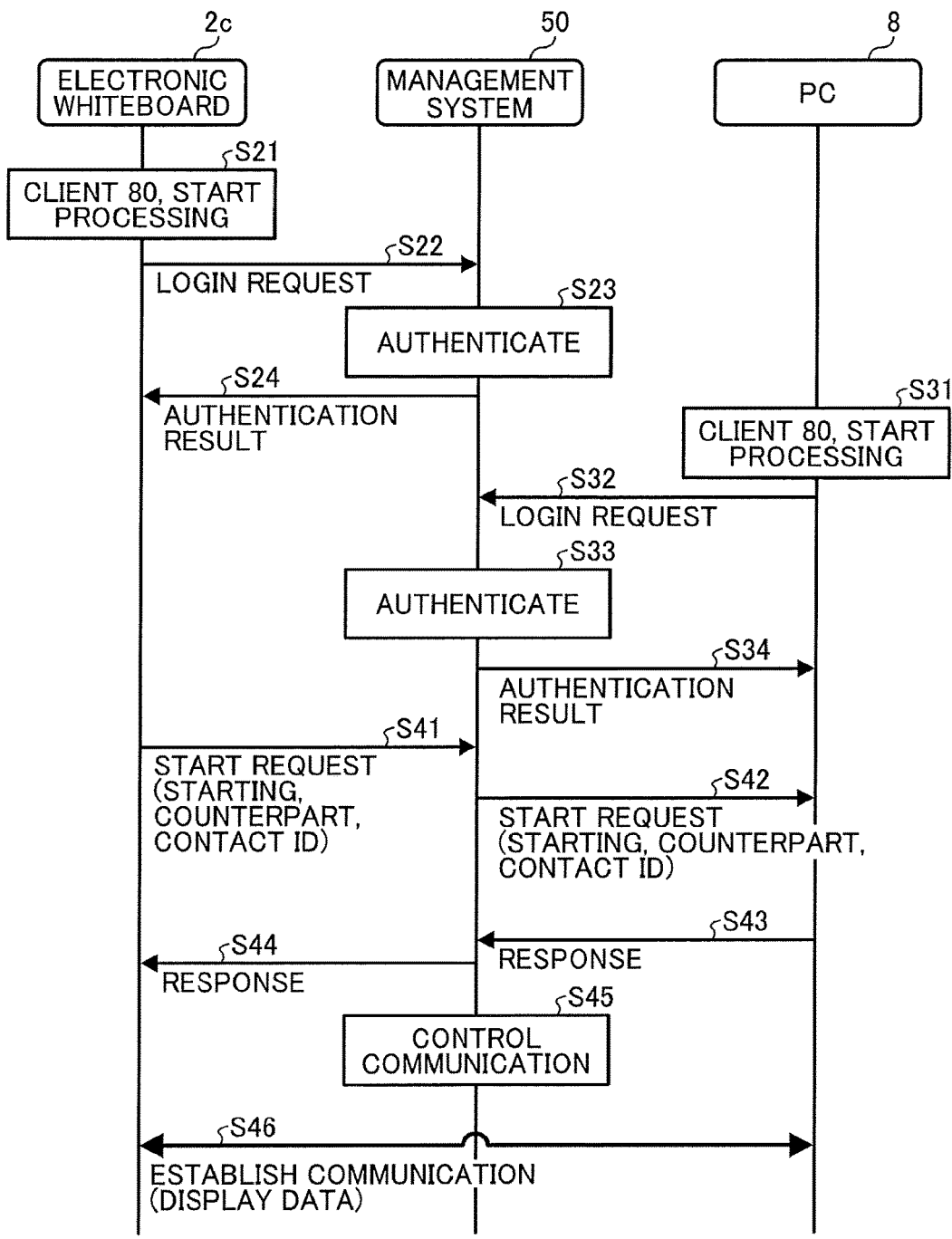
FIG. 9 is a data sequence diagram illustrating operation of establishing communication between the electronic whiteboard and the PC of FIG. 1, according to an embodiment of the present invention.

Referring to FIG. 9, operation of establishing communication between the electronic whiteboard 2*c* and the PC 8, with the communication applications B10 and B11, is described according to an embodiment.

In response to a user input to the display 3*c* that requests activation, the client 20 of the electronic whiteboard 2*c* activates the communication application B10 to start processing by the client 80 (S21).

The communication controller 81 of the client 80 transmits a login request to the management system 50 through the second communication network 9*b* (S22). The management system 50 receives the login request.

The management system 50 authenticates the electronic whiteboard 2*c* that requests for log in (S23). The management system 50 transmits an authentication result to the electronic whiteboard 2*c* (S24). The communication controller 81 of the electronic whiteboard 2*c* receives the authentication result. In the following, it is assumed that the authentication result indicates that the electronic whiteboard 2*c* is allowed for log in.

As the PC 8 receives a request for activating the communication application B11, by a user input through the keyboard 821 or the mouse 822, the communication application B11 is activated to start processing by the client 80 of the PC 8 (S31).

The communication controller 81 of the client 80 transmits a login request to the management system 50 through the second communication network 9*b* (S32). The management system 50 receives the login request.

The management system 50 authenticates the PC 8 that requests for log in (S33). The management system 50 transmits an authentication result to the PC 8 (S34). In the following, it is assumed that the authentication result indicates that the PC 8 is allowed for log in.

In response to the user input to the display 3*c*, the communication controller 81 of the electronic whiteboard 2*c* transmits a request for starting communication (S41). The communication start request includes a contact ID for identifying the electronic whiteboard 2*c* that sends the communication start request, and a contact ID for identifying the PC 8 as a communication destination. The management system 50 receives the communication start request. The contact ID is any information that identifies a communication destination, which includes identification information identifying the communication terminal such as a terminal ID, and identification information identifying a user operating the communication terminal such as a user account.

The management system 50 transmits a communication start request to the PC 8 (S42). The communication start request includes the contact ID for identifying the electronic whiteboard 2*c* as the communication start requester, and the contact ID for identifying the PC 8 as the communication destination, which are transmitted at S41. The PC 8 receives the communication start request.

The communication controller 81 of the PC 8 transmits a response to the communication start request, to the management system 50 (S43). In the following, it is assumed that the PC 8 transmits a response indicating to accept the communication start request, to the management system 50.

The management system 50 receives the response indicating to accept the communication start request. The management system 50 transmits, to the electronic whiteboard 2*c* that is the communication start requester, the response that is received from the PC 8 at S43 (S44). The communication controller 81 of the electronic whiteboard 2*c* receives the response accepting the communication start request.

The management system 50 establishes a communication session between the electronic whiteboard 2*c* and the PC 8, through the second communication network 9*b*, to transmit or receive content data (S45). The communication session may be established in various ways. For example, in case the relay device 30 is provided to relay content data through the second communication network 9*b*, the management system 50 transmits connection data to be used for connecting to the relay device 30, to the electronic whiteboard 2*c* and the PC 8. The management system 50 may transmit a request for starting relay of content data between the electronic whiteboard 2*c* and the PC 8, to the relay device 30. The communication session is established between the electronic whiteboard 2*c* and the PC 8 (S46). Through the established communication session, the electronic whiteboard 2*c* and the PC 8 can exchange content data. In this embodiment, the content data to be transmitted between the electronic whiteboard 2*c* and the PC 8 includes display data, such as data of a presentation material that may be a video image or a still image.

Figure 10:
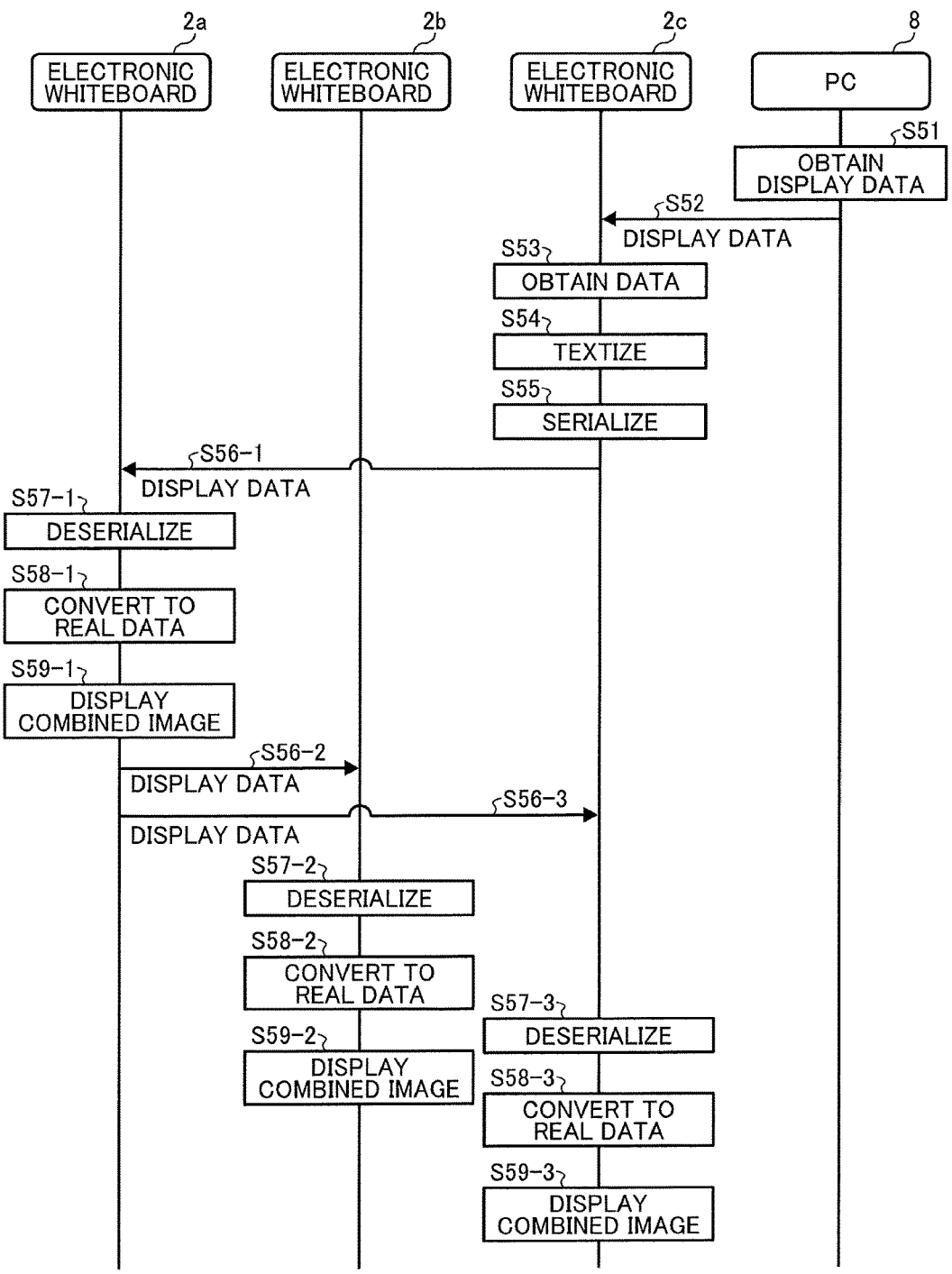
FIG. 10 is a data sequence diagram illustrating operation of processing various image data for output through the electronic whiteboards, according to an embodiment of the present invention.

Referring to FIG. 10, operation of outputting an image to be shared among the electronic whiteboards 2 is described according to an embodiment.

The display controller 82 of the PC 8 obtains display data including an image that is captured at the conference and displayed on the display 820 (S51). The communication controller 81 of the PC 8 transmits the obtained display data, to the client 80 of the electronic whiteboard 2*c*, through the relay device 30 (S52). The communication controller 81 of the electronic whiteboard 2*c* receives the display data transmitted from the PC 8. The communication controller 81 of the electronic whiteboard 2*c* stores the received display data in the memory 2000.

The obtainer 22B of the client 20 in the electronic whiteboard 2*c* obtains the display data stored in the memory 2000 (S53). In case the obtained display data is a video image, the converter 22X of the client 20 in the electronic whiteboard 2*c* may render the video image to generate items of frame data, each being a still image. The converter 22X of the client 20 in the electronic whiteboard 2*c* converts the obtained display data, in a format that can be transmitted by the communication application A11, such as in a text format (S54). The converter 22X serializes the display data, which is converted into text data at S54, to generate serialized display data (S55). The communication controller 21 of the electronic whiteboard 2c transmits the serialized display data, to the communication controller 91 of the electronic whiteboard 2a that is the host terminal (S56-1).

As the communication controller 91 of the electronic whiteboard 2a receives the serialized display data from the electronic whiteboard 2c, the communication controller 91 transmits the received serialized display data to the client 20 of the electronic whiteboard 2a. The communication controller 21 of the client 20 in the electronic whiteboard 2a receives the serialized display data. The converter 22X of the drawing controller 22 of the client 20 de-serializes the serialized display data (S57-1). The converter 22X further converts the de-serialized display data, to real (binary) data (S58-1). At S58-1, the page processor 22Z extracts, from the real data, medium data ID, data type, recording time, X and Y coordinates, image size (width, height), and image data, to store the extracted data in the medium data table (Table 4) in the page data memory 220.

Figure 14A:
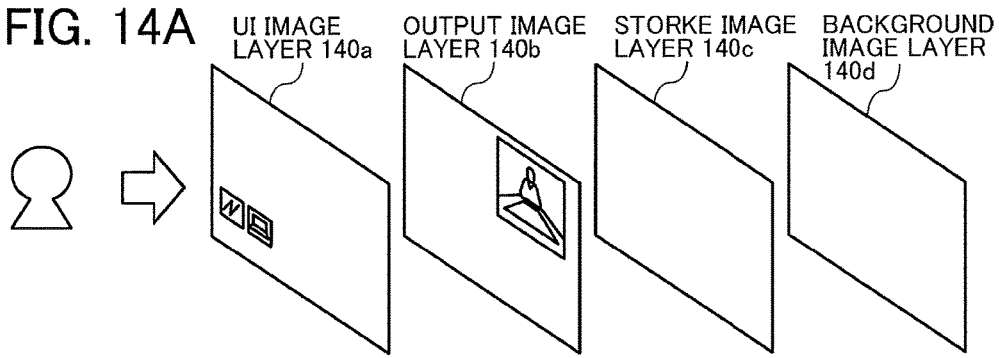
FIGS. 14A to 14D are examples of combined image each having image layers superimposed one above the other.

The combiner 22Y refers to the priority order (Table 5) in the page data memory 220, to overlay on the background image layer 140d, the stroke image layer 140c, the output image layer 140b, the UI image layer 140a, in this order from the bottom to the top, to generate the combined image for display onto the display 3a (S59-1). The output image layer 140b includes an output image formed by the combiner 22Y. More specifically, the output image corresponds to an image taken during the conference, which is registered in the medium data table. The output image of the output image layer 140b has a size and a position, which are registered in the medium data table. FIG. 14A illustrates an example combined image being displayed at the display 3a, on which image layers are superimposed one above the other. FIG. 14A specifically illustrates an example case in which the stroke image is not output, as there is no stroke image being generated. The UI image and the background image are generated based on data stored in the memory 2000.

The communication controller 91 of the electronic whiteboard 2a transmits the serialized display data, transmitted from the electronic whiteboard 2c, to the client 20 of each one of the electronic whiteboards 2b and 2c (S56-2, S56-3). The communication controller 21 of the client 20 in each of the electronic whiteboards 2b and 2c receives the transmitted display data. The client 20 in each of the electronic whiteboards 2b and 2c causes each one of the displays 3b and 3c to display the combined image, which includes the output image generated based on the display data transmitted from the electronic whiteboard 2a. Since this operation is substantially similar to the operation described above referring to S57-1 to S59-1 for the case of the client 20 of the electronic whiteboard 2a, description thereof is omitted (S57-2 to S59-2, S57-3 to S59-3).

Figure 11:
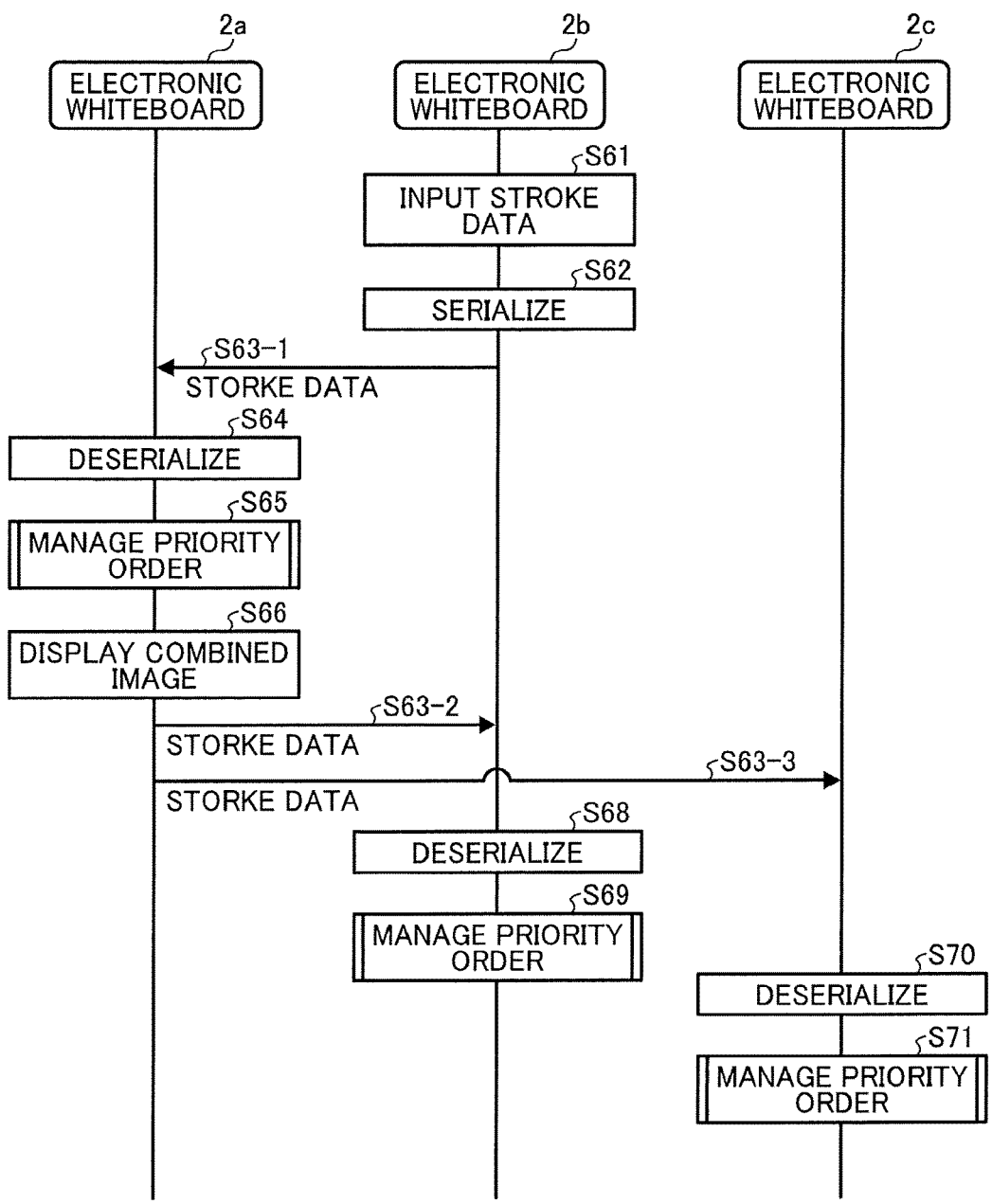
FIG. 11 is a data sequence diagram illustrating operation of controlling an order of displaying various image layers for output through the electronic whiteboards, according to an embodiment of the present invention.

Referring to FIG. 11, operation of displaying the combined image including the stroked image is described according to an embodiment of the present invention.

As the user at the electronic whiteboard 2b draws a stroke drawing on the electronic whiteboard 2b with the electronic pen 4b, the stroke processor 22A of the electronic whiteboard 2b generates stroke data based on the coordinate indicating the contact portion on the display 3b with the electronic pen 4b. The obtainer 22b receives the stroke data generated at the stroke processor 22A (S61). The stroke data includes a plurality of parameters as described referring to Tables 1 to 3. The converter 22X groups a unit of stroke data reflecting a plurality of stroke drawings, and serializes the group of stroke data (S62). The communication controller 21 of the electronic whiteboard 2b transmits the serialized stroke data to the communication controller 91 of the electronic whiteboard 2a that is the host terminal (S63-1). The electronic whiteboard 2b may transmit stroke data, one stroke drawing by one stroke drawing, to the electronic whiteboard 2a as the host terminal, as the stroke drawing is detected on the display 3b.

As the stroked data is received from the electronic whiteboard 2b, the communication controller 91 of the electronic whiteboard 2a transmits the received stroke data to the client 20 of the electronic whiteboard 2a. The communication controller 21 of the client 20 in the electronic whiteboard 2a then receives the transmitted stroke data. The converter 22X of the drawing controller 22 of the client 20 de-serializes the stroke data (S64). The page processor 22Z stores the de-serialized stroke data in the page data memory 220. The combiner 22Y generates a stroked image, that is, a group of stroke drawings, based on the stroke data stored in the page data memory 220. The combiner 22Y in this example manages the priority order in each layer image in displaying the combined image (S65).

Figure 12:
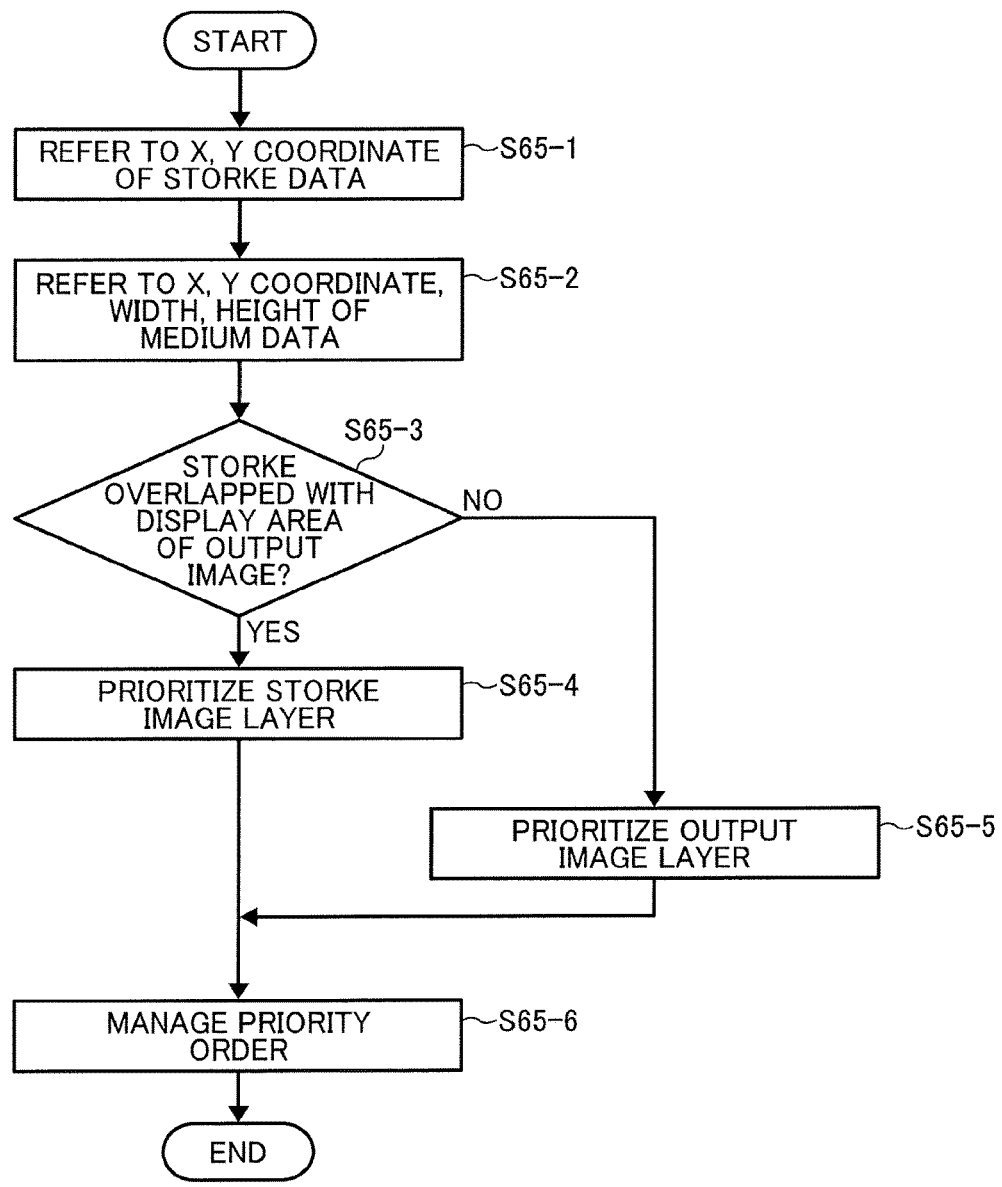
FIG. 12 is a flowchart illustrating operation of managing the order of displaying various image layers, according to an embodiment of the present invention.

Referring to FIG. 12, operation of managing the priority order at S65 is described according to the embodiment. FIG. 12 is a flowchart illustrating operation of managing an order of overlaying the image layers in the combined image. The operation of FIG. 12 is performed by the drawing controller 22 of the electronic whiteboard 2a. More specifically, in this embodiment, the drawing controller 22, which is implemented by the first communication application A11, operates as a display control apparatus that controls an order of overlaying the image layers, as described below referring to FIG. 12.

The combiner 22Y refers to the X and Y coordinates (Table 3) of the stroke data that is newly registered to the page data memory 220 (S65-1). The combiner 22Y refers to the X coordinate, Y coordinate, width, and height (Table 4), which is stored as the medium data in the page data memory 220 (S65-2).

Based on the newly stored stroke data, the combiner 22Y determines whether a stroke drawing to be newly displayed overlaps a display area of the output image to be displayed based on the medium data (S65-3). In the example medium data of Table 4, the output image is to be displayed in a display area 140ba having the X coordinate of 1400 to 1800 and the Y coordinate of 50 to 350. If the newly recorded stroke data has the X coordinate of 1350 and the Y coordinate of 300, the combiner 22Y determines "NO" at S65-3. If the newly recorded stroked data has the X coordinate of 1650 and the Y coordinate of 300, the combiner 22Y determines "YES" at S65-3.

When "YES" at S65-3, the combiner 22Y determines to display the stroke image layer 140c, with a priority higher than that of the output image layer 140b (S65-4). When "NO" at S65-3, the combiner 22Y determines to display the output image layer 140b, with a priority higher than that of the stroke image layer 140c (S65-5).

Based on the determination at S65-4 or S65-5, the combiner 22Y keeps updated the priority order of each image layer that is stored in the page data memory 220 (Table 5) (S65-6). For example, when the stroke image layer 140c is to be displayed in higher priority at S65-4, the combiner 22Y changes a priority order as illustrated in Table 6. In another example, when the output image layer 140b is to be displayed in higher priority at S65-5, the combiner 22Y keeps the priority order as illustrated in Table 5.

TABLE 6

| PRIORITY | LAYER |
| --- | --- |
| 1 | UI IMAGE LAYER |
| 2 | STROKE IMAGE LAYER |
| 3 | OUTPUT IMAGE LAYER |
| 4 | BACKGROUND IMAGE LAYER |

Figure 14B:
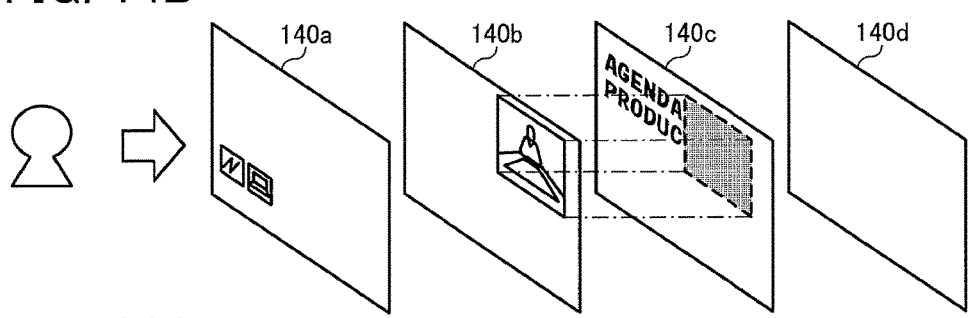
Figure 14C:
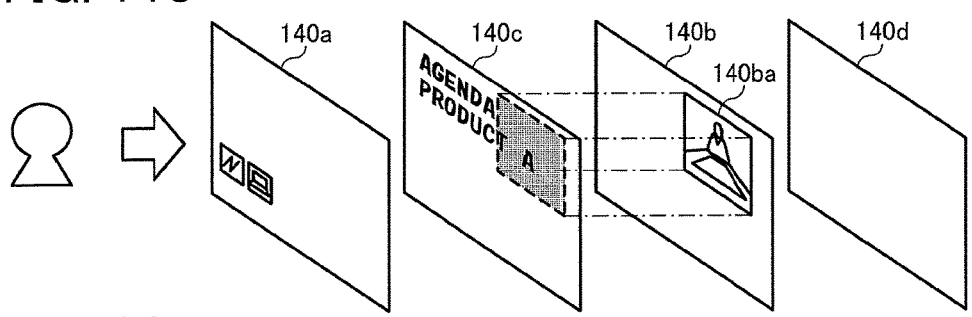

Referring back to FIG. 11, the combiner 22Y causes the display 3a to display the combined image such that each layer image is displayed in the order as stored in the page data memory 220 (S66). For example, in case the priority order table has contents as illustrated in Table 5, the combiner 22Y causes the display 3a to display the combined image, such that the stroke image layer 140c, the output image layer 140b, and the UI image layer 140a are superimposed one above the other in this order, on the background image layer 140d. FIG. 14B illustrates an example case in which the output image layer 140b is displayed in high priority. In another example, in case the priority order table has contents as illustrated in Table 6, the combiner 22Y causes the display 3a to display the combined image, such that the output image layer 140b, the stroke image layer 140c, and the UI image layer 140a are superimposed one above the other in this order from the bottom to the top, on the background image layer 140d. FIG. 14C illustrates an example case in which the stroke image layer 140c is displayed in high priority. In this disclosure, the image layer with higher priority is to be displayed on top of the image layer with lower priority.

Referring back to FIG. 11, the communication controller 91 of the electronic whiteboard 2a transmits the serialized stroke data, transmitted from the electronic whiteboard 2b, to the clients 20 of the electronic whiteboards 2b and 2c, respectively (S63-2, S63-3). The communication controller 21 of the client 20 in each one of the electronic whiteboards 2b and 2c receives the transmitted stroke data. The clients 20 of the electronic whiteboards 2b and 2c respectively display the combined images on the displays 3b and 3c. Since this operation is substantially similar to the operation described above referring to S64 to S66 for the case of the client 20 of the electronic whiteboard 2a, description thereof is omitted (S68 to S71). The operation of drawing the stroke image, is performed by the client 20 at each one of the electronic whiteboards 2a and 2c, in a substantially similar manner as described above referring to S61 to S71 that is performed by the client 20 of the electronic whiteboard 2.

In the above-described embodiment, after controlling the stroke image layer 140c to be displayed in high priority as illustrated in FIG. 14C, a stroke drawing may be drawn to an area different than the display area of the output image. In such case, the combiner 22Y determines "NO" at S65-3. Accordingly, as illustrated in FIG. 14B, the combiner 22Y automatically displays the output image layer 140b in high priority (S65-5).

Figure 13:
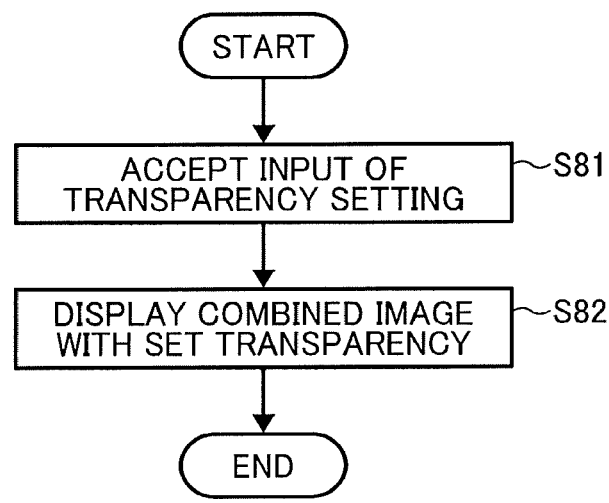
FIG. 13 is a flowchart illustrating operation of controlling a transparency of a combined image, according to an embodiment of the present invention.

The above-described operation of controlling display of a combined image may be performed in various other ways. The following describes a modified example. In the modified example, the electronic whiteboard 2 controls a transparency of the layer image to be displayed in high priority, which may be selected from the output image layer 140b and the stroke image layer 140c. FIG. 13 is a flowchart illustrating operation of controlling a transparency of the layer image to be displayed in high priority, according to the modified example.

Figure 14D:
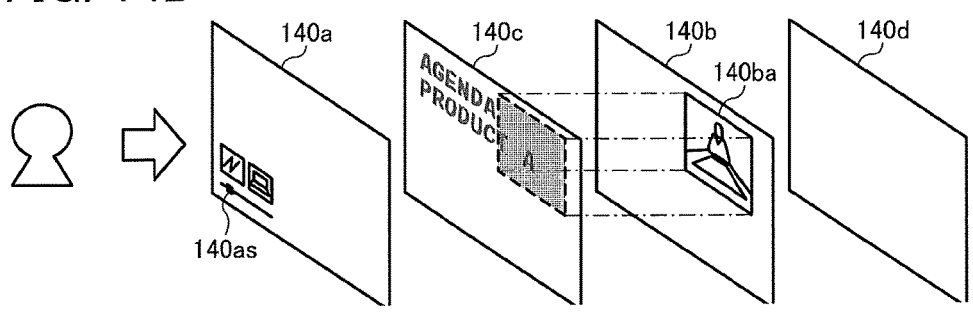

FIG. 14D illustrates a combined image to be displayed according to this example. The combiner 22Y of the electronic whiteboard 2 generates the combined image, which includes the UI image layer 140a having a slider 140as for allowing the user to set a transparency. The user is able to move the position of the slider 140as, from the left to the right, to set a transparency value.

The obtainer 22B receives the set value of the transparency for the image layer to be displayed in high priority, which is indicated by the selected position of the slider 140as (S81). For example, when the selected position of the slider 140as is at the left end, the combiner 22Y accepts the transparency value of 100%. In another example, when the selected position of the slider 140as is at the right end, the combiner 22Y accepts the transparency value of 0%. In another example, when the selected position of the slider 140as is any point between the right end and the left end, the combiner 22Y accepts the transparency value according to that position, which is greater than 0% but less than 100%.

The combiner 22Y refers to the priority order as stored in the page data memory 220, and causes the display 3a to display the combined image such that layer images are superimposed one above the other according to the referred priority order. In such case, the combiner 22Y displays one of the output image layer 140b and the stroke image layer 140c, with higher priority, to have a transparency value that is set according to the user selection (S82). For example, when the stroke image layer 140c is to be displayed in high priority as illustrated in FIG. 14D, and the selected transparency value is 80%, the combiner 22Y displays the stroke image layer 140c with a transparency of 80%. Accordingly, the output image layer 140b can be seen, through the stroke image layer 140c that is partly transparent.

In any one of the above-described embodiments, the drawing controller 22 (obtainer 22B) of the electronic whiteboard 2 receives a user input for stroke drawing on the display 3, and generates stroked data based on the detected user input. The communication controller 21 of the electronic whiteboard 2 receives the stroke data transmitted from the other electronic whiteboard 2, or the server 90 within the local electronic whiteboard 2. The drawing controller 22 (combiner 22Y) combines a stroke image layer 140c having a stroke drawing image as indicated by the input stroke data, and an output image layer 140b that is generated based on medium data, to generate a combined image.

In one embodiment, by default, the drawing controller 22 generates the combined image, such that the output image layer 140b is superimposed on the stroke image layer 140c. When the stroke drawing image is to be formed at a portion that at least partly overlaps the output image, the drawing controller 22 changes an order of overlapping the image layers, such that the stroke image layer 140c is superimposed on the output image layer 140b. This prevents the stroke image layer 140c to be hidden by the output image layer 140b.

In case the stroke drawing image is to be formed at a portion that does not overlap the output image, the drawing controller 22 again changes an order of overlapping the image layers, such that the output image layer 140b is superimposed on the stroke image layer 140c. This prevents the output image layer 140b to be hidden by the stroke image layer 140c.

In one embodiment, the drawing controller 22 may receive a user input that sets a transparency of the layer image, for example, through a slider being displayed on the user interface. The drawing controller 22 causes one of the stroke image layer 140c and the output image layer 140b, which is to be placed on top of the other, to be partly transparent according to the set transparency. This enables the user to see both image layers, even the stroke image layer 140*b* and the output image layer 140*c* have content to be displayed while being overlapped with each other.

In any one of the above-described embodiments, the medium data may be transmitted from any communication terminal other than the PC 8. For example, the medium data, such as data of a presentation material or data of a captured image, may be shared among the electronic whiteboards 2.

The communication applications A11, B10, and B11 may each be recorded in a file in a format installable or executable on a computer-readable recording medium for distribution. Examples of such recording medium include, but not limited to, compact disc-recordable (CD-R), digital versatile disc (DVD), and blue-ray disc. In addition, a memory storing any one of the above-described control programs, such as a recording medium including a CD-ROM or a HDD, may be provided in the form of a program product to users within a certain country or outside that country.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, in the above-described embodiments, the electronic whiteboards 2 and the PC 8 are described as examples of apparatus capable of sharing images, however, any other apparatus can be used to share images. Examples of such apparatuses include, but not limited to, videoconference terminal, projector, digital signage, text sharing device, car navigation system, game machine, personal digital assistant (PDA), and remote diagnosis system.

In another example, any one of the electronic whiteboards 2*a* to 2*c* may operate as the display control apparatus capable of controlling an order of overlaying the layer images. Further, any apparatus other than the electronic whiteboard 2 may operate as the display control apparatus, as long as such apparatus is installed with the communication application A11 having the communication function and the image processing function.

In another example, while the electronic whiteboard 2*a* manages images to be shared among the plurality of electronic whiteboards 2, the electronic whiteboard 2*a* may only control display of an image for display at the electronic whiteboard 2*a*. In such case, the electronic whiteboard 2*a* obtains information regarding the stroke drawing that is input to the display 3*a*.

Any one of the electronic whiteboard 2, the PC 8, the relay device 30, and the management system 50 may be implemented as a single apparatus or a plurality of apparatuses to which divided portions (functions) are allocated.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

As described above, the present invention can be implemented in any convenient form, for example using dedicated hardware, or a mixture of dedicated hardware and software.

The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on.

The invention claimed is:

1. A display control apparatus, comprising:
   circuitry configured to
      obtain coordinate information indicating a specific coordinate on a display surface that a user activity is detected, the coordinate information being received from an external communication apparatus provided with the display surface through a network, and
      generate 1) a first image layer having a first image drawn based on a stroke drawing input provided by the user at the display surface at a position indicated by the coordinate information to reflect the user activity and 2) a second image layer having a second image to be displayed together with the first image; and
   a memory that stores order information indicating an order of overlaying a plurality of image layers to be displayed, the order information being previously set to indicate that the second image layer is to be superimposed on the first image layer,
   wherein, in response to obtaining the coordinate information from the external communication apparatus through the network, the circuitry determines whether the first image at least partly overlaps the second image, and changes the order information stored in the memory so as to cause the first image layer to be superimposed on the second image layer based on a determination indicating that the first image at least partly overlaps the second image.

2. The display control apparatus of claim 1, wherein the circuitry determines whether a first image at least partly overlaps a second image every time the receiver newly receives coordinate information in response to detection of a user activity on the display surface, and changes the order information that has been changed, so as to cause the second image layer to be superimposed on the first image layer based on a determination indicating that the first image does not overlap the second image.

3. The display control apparatus of claim 1, wherein the circuitry further obtains transparency value information indicating a transparency value input by the user, and causes the first image layer to be at least partly transparent as indicated by the transparency value information when displaying the first image layer with the second image layer.

4. The display control apparatus of claim 1, wherein the circuitry further receives image data to be used for generating the second image from an external communication apparatus through the network.

5. The display control apparatus of claim 4, wherein the image data to be used for generating the second image is image data that has been previously displayed on the display surface before the user activity is detected.

6. A communication system comprising:
   the display control apparatus of claim 1; and
   one or more communication apparatuses each capable of displaying a combined image on which the plurality of image layers are superimposed one above the other according to the order information.

7. The display control apparatus of claim 1, wherein the coordinate information indicates a contact position where one of an electronic pen and a user's hand touches on the display surface.

8. The display control apparatus of claim 1, wherein the first image layer is transparent except for the first image, and the second image layer is transparent except for the second image.

9. The display control apparatus of claim 1, wherein the first image layer and the second image layer have a same area size and are configured to completely overlap each other.

10. A display control method, comprising:
   obtaining coordinate information indicating a specific coordinate on a display surface that a user activity is detected, the coordinate information being received from an external communication apparatus provided with the display surface through a network;
   generating 1) a first image layer having a first image drawn based on a stroke drawing input provided by the user at the display surface at a position indicated by the coordinate information to reflect the user activity and 2) a second image layer having a second image to be displayed together with the first image;
   storing, in a memory, order information indicating an order of overlaying a plurality of image layers to be displayed, the order information being previously set to indicate that the second image layer is to be superimposed on the first image layer,
   in response to obtaining coordinate information from the external communication apparatus through the network, determining whether the first image at least partly overlaps the second image; and
   changing the order information stored in the memory so as to cause the first image layer to be superimposed on the second image layer based on a determination indicating that the first image at least partly overlaps the second image.

11. The display control method of claim 10, further comprising:
   determining whether a first image at least partly overlaps a second image every time the receiver newly receives coordinate information in response to detection of a user activity on the display surface; and
   changing the order information that has been changed, so as to cause the second image layer to be superimposed on the first image layer based on a determination indicating that the first image does not overlap the second image.

12. The display control method of claim 10, further comprising:
   obtaining transparency value information indicating a transparency value input by the user; and
   causing the first image layer to be at least partly transparent as indicated by the transparency value information when displaying the first image layer with the second image layer.

13. A non-transitory recording medium that stores a program that when, executed by a display control apparatus, causes the display control apparatus to perform a display control method comprising:
   obtaining coordinate information indicating a specific coordinate on a display surface that a user activity is detected, the coordinate information being received from an external communication apparatus provided with the display surface through a network;
   generating 1) a first image layer having a first image drawn based on a stroke drawing input provided by the user at the display surface at a position indicated by the coordinate information to reflect the user activity and 2) a second image layer having a second image to be displayed together with the first image;
   storing, in a memory, order information indicating an order of overlaying a plurality of image layers to be displayed, the order information being previously set to indicate that the second image layer is to be superimposed on the first image layer,
   in response to obtaining coordinate information from the external communication apparatus through the network, determining whether the first image at least partly overlaps the second image; and
   changing the order information stored in the memory so as to cause the first image layer to be superimposed on the second image layer based on a determination indicating that the first image at least partly overlaps the second image.

* * * * *